United States Patent [19]

Marder

[11] 3,947,530

[45] Mar. 30, 1976

[54] SELF-PRIMING CENTRIFUGAL PUMP

[75] Inventor: William Z. Marder, North Wales, Pa.

[73] Assignee: Zevco Enterprises, Inc., Lansdale, Pa.

[22] Filed: Aug. 14, 1974

[21] Appl. No.: 497,444

[52] U.S. Cl. .......................... 261/7; 415/88; 415/89; 261/91; 261/121 M
[51] Int. Cl.² ....................... B01F 3/04; F04D 1/12
[58] Field of Search ............... 259/95, 96; 210/169; 415/88, 89, 143; 261/91, 121 M, 7, 89

[56] References Cited
UNITED STATES PATENTS

| | | | |
|---|---|---|---|
| 905,024 | 11/1908 | Trent | 415/89 |
| 1,673,594 | 6/1928 | Schmidt | 43/53 |
| 1,862,906 | 6/1932 | Preleuthner | 259/96 |
| 1,895,027 | 1/1933 | De Mees | 415/88 |
| 2,190,897 | 2/1940 | Underwood | 259/96 |
| 3,181,796 | 5/1965 | Keller | 415/88 |
| 3,204,768 | 9/1965 | Daniel | 261/91 |
| 3,220,707 | 11/1965 | Weatherston et al. | 261/91 |

FOREIGN PATENTS OR APPLICATIONS

| | | | |
|---|---|---|---|
| 1,462 | 4/1907 | United Kingdom | 415/89 |
| 1,182,993 | 3/1970 | United Kingdom | 415/89 |

*Primary Examiner*—Henry F. Raduazo
*Attorney, Agent, or Firm*—Seidel, Gonda & Goldhammer

[57] ABSTRACT

A self-priming centrifugal pump includes a housing having an inverted frusto-conically shaped lower portion. A centrifugal impeller is suspended from the shaft of a motor mounted in the top portion of the housing. The centrifugal impeller includes a solids collector member removably attached to its lower end. A cylindrical inlet tube, integral with the frusto-conically shaped lower housing portion, extends into the interior of the centrifugal impeller through an opening in the lower end of the solids collector member. An inverted dish shaped impeller member is located above the centrifugal impeller and directs and impels fluid pumped by the centrifugal impeller toward a plurality of efflux ports located in the pump housing. The centrifugal impeller includes an air hole in the conical wall thereof to allow air to escape as the pump is priming.

19 Claims, 3 Drawing Figures

U.S. Patent  March 30, 1976  3,947,530
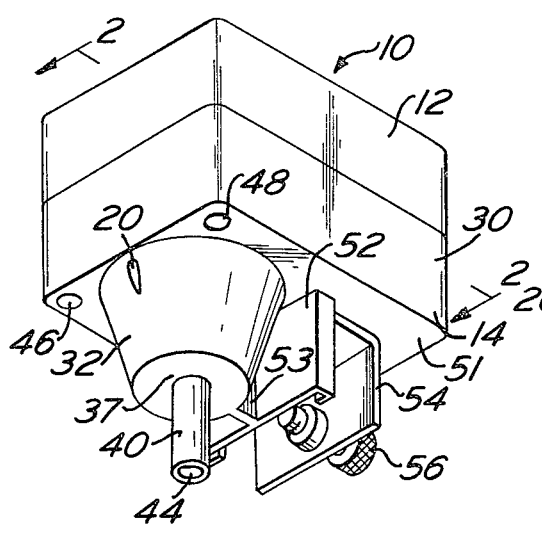
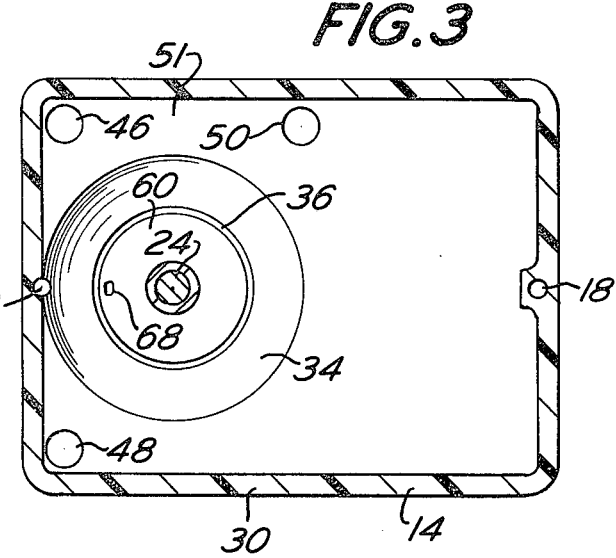
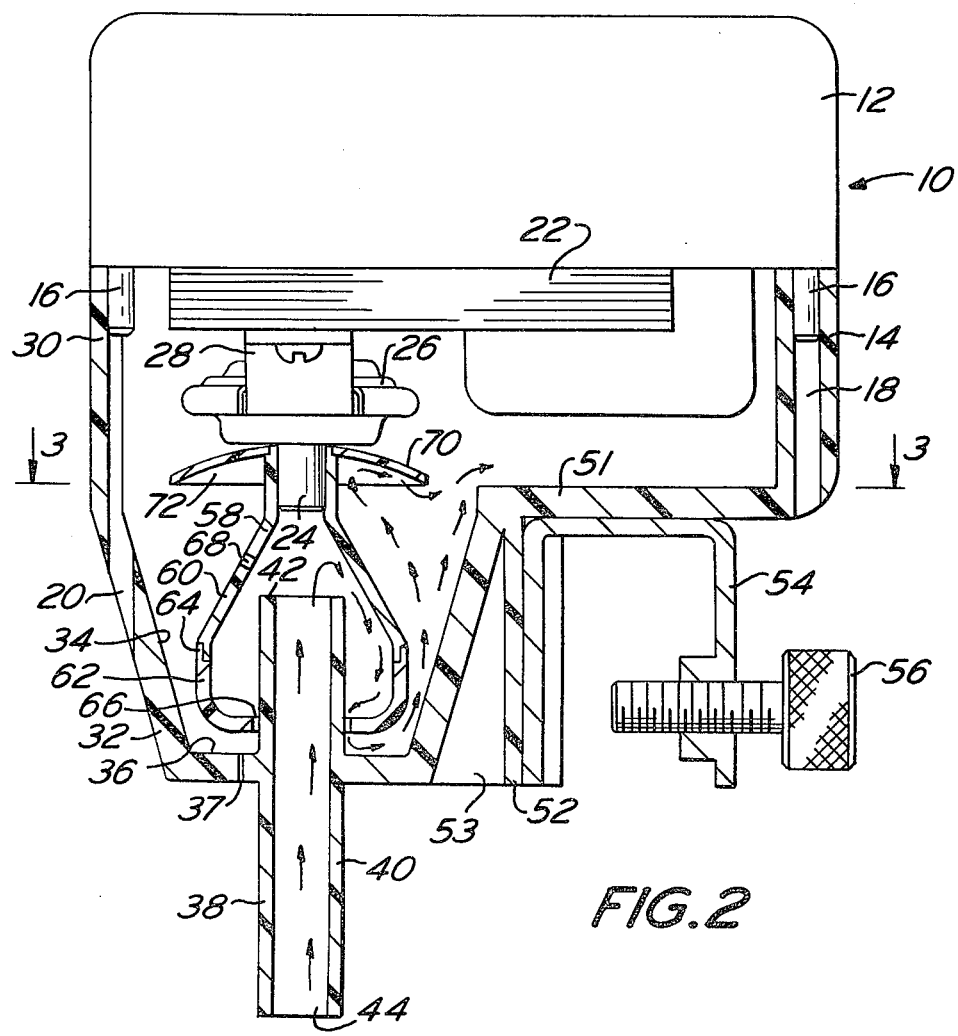

SELF-PRIMING CENTRIFUGAL PUMP

This invention relates to a self-priming centrifugal pump and more particularly to a self-priming centrifugal pump which removes suspended solids from a solid and which also aerates the fluid.

The pump of the present invention is particularly useful as an aquarium pump for removing suspended solids from the water while simultaneously aerating the water. As an aquarium type pump, means can be provided for affixing the pump directly to one of the side walls of the aquarium. The pump of the present invention, in a larger scale, is also useful for cleaning swimming pools or other large bodies of fluids.

In addition to being useful for cleaning contaminated fluids and for separating suspended solids from fluids, the present pump, because of the low shearing forces created therein, has many pharmaceutical applications such as separating fungi from a fluid medium.

The pump in accordance with the present invention is self-priming and accordingly is exceedingly simple to operate. Furthermore, the centrifugal pump of the present invention has essentially only one moving part and requires no gaskets or similar sealing members. As a result, the pump is highly reliable and essentially maintenance free.

The self-priming centrifugal pump of the present invention includes a housing having an inverted frusto-conically shaped lower portion. A centrifugal impeller is suspended from the shaft of a motor mounted in the top portion of the housing. This centrifugal impeller includes a solids collector member which is removably attached to the lower end of the impeller. A cylindrical inlet tube, integral with the frusto-conical shaped lower housing portion, extends into the interior of the centrifugal impeller through an opening in the lower end of the solids collector member. The lower end of the inlet tube extends below the bottom of the frusto-conically shaped lower housing portion and is adapted to be immersed into the fluid to be pumped. An inverted dish shaped impeller member is located above the centrifugal impeller and directs and impels fluid pumped by the centrifugal impeller toward a plurality of efflux ports located in the pump housing. An air hole is located in the conical wall of the centrifugal impeller to allow air to escape as the pump is priming.

It is an object of the present invention to provide a centrifugal pump which is self-priming.

It is another object of the present invention to provide a centrifugal pump which is capable of removing suspended solids from a fluid.

It is a further object of the present invention to provide a centrifugal pump which is capable of aerating the fluid being pumped.

It is a still further object of the present invention to provide a centrifugal pump which is highly reliable and easy to operate.

It is a still further object of the present invention to provide a centrifugal pump which creates low shearing forces on the fluid being pumped.

Further objects and advantages of the present invention will appear hereinafter from the following description of the preferred embodiment of the invention.

For the purpose of illustrating the invention, there is shown in the drawing a form which is presently preferred; it being understood, however, that this invention is not limited to the precise arrangements and instrumentalities shown.

FIG. 1 is a perspective view of the pump constructed in accordance with the present invention;

FIG. 2 is a partial sectional view taken along the lines 2—2 of FIG. 1, and

FIG. 3 is a sectional view taken along the lines 3—3 of FIG. 2.

Referring now to the drawing in detail, wherein like numerals in each of the figures indicate like elements, there is shown in FIG. 1 a perspective view of a pump constructed in accordance with the present invention and designated generally as 10. The pump 10 includes a housing having a top rectangular box member 12 and a bottom member 14. As best seen in FIG. 2, studs 16 which pass through stud holes 18 and 20 in the bottom housing member 14 serve to hold the top housing member 12 and bottom housing member 14 together and in proper alignment with each other.

An electric motor 22 is securely fastened within the top housing portion 12 by means of screws or other fastening devices well known in the art. In the preferred embodiment of the present invention, motor 22 is an Alliance 115 volt shaded-pole induction motor which has an operating speed of approximately 3200 RPM. However, it should be readily apparent that various other types of motors may also be used in place of this particular motor. As best seen in FIG. 2, motor 22 is positioned within the top portion 12 of the housing so that motor shaft 24 extends downwardly into the bottom portion 14 of the housing. Motor shaft 24 is supported by bearings 26 which are secured to the motor 22 by bracket 28.

Bottom housing member 14 includes an upper rectangular box portion 30 and an inverted truncated or frusto-conical section 32. Section 32 forms a chamber having an internal conical wall 34 which, as best seen in FIG. 2, tapers upwardly and outwardly toward the remaining interior parts of bottom housing member 14. Conical section 32 also includes a ring shaped flat bottom wall 36 which has a small hole 37 therein. A concentrically mounted cylindrical inlet tube 38 passes through bottom wall 36 and includes a lower portion 40 which is adapted to be submerged into the fluid to be pumped and an upper portion 42 which extends into the interior of the conical section 32. An influx port 44 passes through inlet tube 38.

As best seen in FIGS. 1 and 3, a plurality of efflux ports such as ports 46, 48 and 50 are provided in the bottom wall 51 of the rectangular housing portion 30 adjacent the top edge of conical section 32. In addition, stud hole 20 may also serve as an efflux port. While four efflux ports are illustrated, it will be readily apparent that a fewer or greater number of ports may be provided. It has been found that it is preferable to provide more efflux ports than may be necessary and to then plug or cover any undesired ports. The reason for doing this will become apparent from the discussion of the operation of the pump below.

Secured to the bottom wall 51 of the bottom housing portion 14 is a mounting plate 52. Vertical wall member 53 extends between mounting plate 52 and frusto-conical section 32 to provide support for mounting plate 52. A U-shaped clamp 54 is adapted to slide into mounting plate 52 and is also adapted to fit over the edge of a fluid container such as an aquarium or fish tank. Once the U-shaped clamp 54 is positioned over the wall of the aquarium or other fluid container, it is held securely in place by tightening thumb screw 56.

As shown in FIG. 2, a centrifugal impeller 58 is suspended from motor shaft 24 into the conical chamber of truncated conical section 32 of the bottom housing portion 14 and is concentrically arranged with respect to the conical chamber. Centrifugal impeller 58 includes an upper impeller section 60 and a lower cup shaped solids collector portion 62. Upper impeller section 60 has an internal conically shaped wall which tapers downwardly and outwardly away from motor shaft 24 and is substantially the opposite direction from the taper of internal conical wall 34. The upper impeller section 60 and solids collector portion 62 are detachably secured together by friction fit such as shown at 64. A concentric hole formed in the bottom wall of the solids collector portion 62 is large enough to accommodate the upper portion 42 of inlet tube 38 and leaves an annular opening 66 between the bottom edge of the solids collector portion 62 and the inlet tube 38. A small air hole 68 is also formed in the wall of the upper impeller section 60 of the centrifugal impeller 58.

A second impeller 70 is concentrically mounted above centrifugal impeller 58 on motor shaft 24 so as to rotate therewith. Impeller 70 may be vertically adjustable so that the distance between the two impellers can be changed. This second impeller 70 has an inverted dish shape with a lower surface 72 facing downwardly toward the conical chamber of conical section 32 of the bottom housing portion 14.

The above described pump operates in the following manner: After clamp 54 is positioned over the wall of a fluid container such as an aquarium or the like and securely fastened thereto, mounting plate 52 is slid over clamp 54. In this operating position the lower end 40 of inlet tube 38 and the lower end of conical housing section 32 are immersed in the fluid. The fluid level in the container should be high enough so that when the pump 10 is in position, fluid passes upwardly through hole 37 and accumulates in the bottom of the conical chamber of housing section 32 to a level just above the bottom wall of the solids collector member 62. This fluid forms a seal between bottom wall 36 and the bottom of the solids collector member 62 thereby eliminating the need for a gasket. The motor 22 is then energized and impellers 58 and 70 begin to rotate.

As impeller 58 rotates, the air and fluid initially within the upper impeller section 60 move outwardly and downwardly along the inner conical wall of section 60 as a result of centrifugal force. This creates a low pressure area adjacent the top of the upper portion 42 of inlet tube 38. As a result of this low pressure area, fluid is drawn up influx port 44 as shown by the arrows in FIG. 2. Air hole 68 in upper impeller section 60 allows the air in this section to escape as the fluid is drawn up influx port 44. Thereafter, and as a result of centrifugal force, the fluid being drawn up influx port 44 is accelerated and forced outwardly and downwardly along the inner conical wall of upper section 60. As a result of the inwardly extending bottom wall of the solids collector member 62 and as a result of the fluid pressure being created by centrifugal force in the upper impeller section 60, fluid in the solids collector member 62 is forced to accelerate and flow inwardly against the centrifugal force created by the rotation of the solids collector member 62. Accordingly, the fluid is then forced through the annular opening 66 to the bottom of the chamber of housing section 32.

It should readily be apparent to those skilled in the art that while the arrows illustrating the fluid flow indicate movement in only two directions, the fluid on either side of the centrifugal impeller 58 is also rotating in the same direction as the rotation of impeller 58 caused by motor 22. In other words, the flow of fluid is actually in the form of a vortex or helix.

Since the fluid at the bottom of the chamber in conical housing section 32 is rotating under the influence of impeller 58, the centrifugal force generated thereby moves the fluid outwardly and up the inner conical wall 34 of section 32. When the fluid reaches the top of the inner conical wall 34, it moves outwardly away from the rotating impeller and toward the efflux ports 20, 46, 48 and 50. As shown also by the arrows in FIG. 2, some of the fluid on the outside of impeller 58 may not be rotating fast enough so as to be drawn up conical wall 34 by centrifugal force. This fluid, therefore, tends to move upwardly toward dish shaped impeller 70. As the fluid strikes surface 72 of impeller 70 it is again caused to rotate by the rotating movement of impeller 70. As a result, the fluid is moved outwardly by centrifugal force and again joins the flow of fluid moving up the inner conical wall 34 toward the efflux ports. The vertical position of impeller 70 may be adjustable so that the vertically moving fluid can be made to contact the surface 72 of the impeller.

As the fluid moves toward the efflux ports along the surface of bottom wall 51, it becomes aerated by the air contained in the pump housing around and below the motor 22. The fluid is further aerated as it flows freely from the efflux ports back to the fluid container. As stated above, several efflux ports are provided. This is done so that the amount of agitation or the flow of fluid within the fluid container can be controlled. Thus, if very little agitation is desired, each of the efflux ports 20, 46 and 48 may be blocked thereby leaving only efflux port 50 open. Thus, if the pump is located adjacent one corner of the fluid container, the fluid return will be through efflux port 50 and down into the container immediately adjacent the corner thereof. This would create very little agitation within the container. On the other hand, if it were desired to create more agitation or fluid flow within the container, the remaining efflux ports may be opened and the pump may be moved away from a corner of the fluid container whereby fluid would be returned to the container through the efflux ports which are located at a distance away from the side of the container. This would create a substantial amount of agitation or fluid flow within the container.

Returning to FIG. 2, it will be readily apparent to those skilled in the art that any solid particles which may have been drawn up through influx port 44 would be held against the inner wall of the solids collector member 62 as a result of centrifugal force. When it is desired to remove the solid particles from the pump, it is only necessary to remove the upper housing portion 12 from the lower housing portion 14 and remove the solids collector member 62 from the upper impeller section 60 of impeller 58.

While the pump of the present invention has been described as including a centrifugal impeller and a lower housing portion each having conically shaped inner walls, it should be understood that this is by way of example only. It is also possible to design these walls in the shape of paraboloids or other similar shapes which taper in the directions of the conical walls shown in the drawing.

Since the pump of the present invention employs no blades or vanes, there are few shearing forces created within the moving fluid. As a result, the pump of the present invention can be used whenever shearing forces must be kept at a minimum. For example, the pump has many pharmaceutical applications such as separating fungi from a fluid medium. These fungi would be collected in the solids collector 62 and can be removed simply by removing the solids collector 62 from the conical section 60 of impeller 58.

It is also possible to use the present pump only as a centrifugal pump and not as a device for separating solids from a fluid. This can be done by eliminating the bottom wall of the solids collector member 62 or simply by completely removing the solids collector member from the upper impeller member 60.

The present invention may be embodied in other specific forms without departing from the spirit or essential attributes thereof and, accordingly, reference should be made to the appended claims, rather than to the foregoing specification as indicating the scope of the invention.

I claim:

1. A centrifugal pump comprising:
   a housing and a chamber having a substantially circular cross-section within said housing, the walls of said chamber tapering outwardly in a first direction;
   a centrifugal impeller having an interior cavity with a substantially circular cross-section mounted for rotation within said chamber, said centrifugal impeller and said chamber being substantially concentric with each other, the walls of said cavity within said centrifugal impeller tapering in a second direction opposite to the direction of taper of the walls of said chamber;
   a dish-shaped impeller substantially concentric with said centrifugal impeller and being mounted for rotation therewith, said dish-shaped impeller being mounted in a position remote from the smaller end of said chamber;
   an inlet pipe extending from the exterior of said housing through the smaller end of said chamber and into the cavity of said centrifugal impeller; and at least one efflux port located within said housing.

2. A centrifugal pump as claimed in claim 1 wherein said chamber and said cavity are substantially conically shaped.

3. A centrifugal pump as claimed in claim 1 further including means detachably connected to the larger end of said centrifugal impeller for collecting solids.

4. A centrifugal pump as claimed in claim 1 including means for adjusting the axial position of said dish shaped impeller.

5. A centrifugal pump as claimed in claim 1 including means for securing the pump housing to the wall of a fluid container.

6. A centrifugal pump as claimed in claim 1 wherein said centrifugal impeller includes an air hole passing from said cavity through the wall of said impeller adjacent the smaller end of said cavity.

7. A centrifugal pump as claimed in claim 1 further including a small hole in said housing adjacent the smaller end of said chamber.

8. A centrifugal pump including a housing having a chamber therein, the walls of said chamber being tapered, an inlet pipe extending from the exterior of said housing into said chamber, a first impeller means within said housing for drawing fluids through said inlet pipe and for forcing the fluid up the tapered walls of said chamber, an efflux port in said housing and a second impeller means within said housing for directing and impelling at least a part of the fluid forced up by said first impeller means toward said efflux port.

9. A centrifugal pump as claimed in claim 8 wherein said first and second impeller means are concentrically mounted for rotation about a common axis.

10. A centrifugal pump as claimed in claim 9 wherein said first impeller means has an interior cavity with tapered walls and includes a solids collector means detachably connected to one end thereof.

11. A centrifugal pump as claimed in claim 10 wherein said inlet pipe extends into the interior of said cavity of said first impeller means and is concentric therewith.

12. A centrifugal pump as claimed in claim 11 wherein said chamber and said cavity are conically shaped.

13. A centrifugal pump and separator comprising a housing having at least one efflux port and a chamber within said housing, said chamber being of substantially circular cross-sectional shape and having a bottom wall; a centrifugal impeller and a solids collector member mounted on a vertical axis for rotation within said chamber, said impeller and said solids collector member having internal walls defining a cavity with an opening at the bottom thereof, said cavity having a substantially circular cross-section throughout, the internal walls of said impeller tapering downwardly and radially outwardly and at least a part of the walls of said solids collector member extending radially inwardly, the walls of said solids collector member terminating at said opening; a non-rotatable inlet pipe integral with the bottom wall of said chamber and extending upwardly through said opening into the interior of said cavity of said impeller, the outer diameter of said inlet pipe being less than the diameter of said opening thereby forming an annular opening between said inlet pipe and the walls of said solids collector member; whereby rotation of said impeller and solids collector member causes fluid to be drawn up said inlet pipe, forced down the walls of said impeller, inwardly towards said annular opening, through said annular opening and out said at least one efflux port and whereby any solids originally suspended in said fluid are forced radially outwardly by said impeller and solids collector member and are retained in said solids collector member.

14. A separating means as claimed in claim 13 wherein said impeller and said solids collector member are detachably connected together.

15. A centrifugal pump and separator as claimed in claim 13 wherein said chamber and said cavity are substantially conically shaped.

16. A centrifugal pump and separator as claimed in claim 13 wherein said centrifugal impeller includes an air hole passing from said cavity through the wall of said impeller adjacent the upper end thereof.

17. A centrifugal pump and separator as claimed in claim 13 further including a small hole in the bottom wall of said chamber.

18. A centrifugal pump and separator as claimed in claim 13 further including a dish-shaped inpeller substanially concentric with said centrifugal impeller and being mounted for rotation therewith, said dish-shaped impeller being mounted in a position remote from the bottom wall of said chamber.

19. A centrifugal pump and separator as claimed in claim 18 including means for adjusting the axial position of said dish-shaped impeller.

* * * * *